Aug. 11, 1925.
B. D. HORTON
1,548,883
ELECTRIC SWITCH AND TEST DEVICE
Original Filed April 22, 1913   3 Sheets-Sheet 1
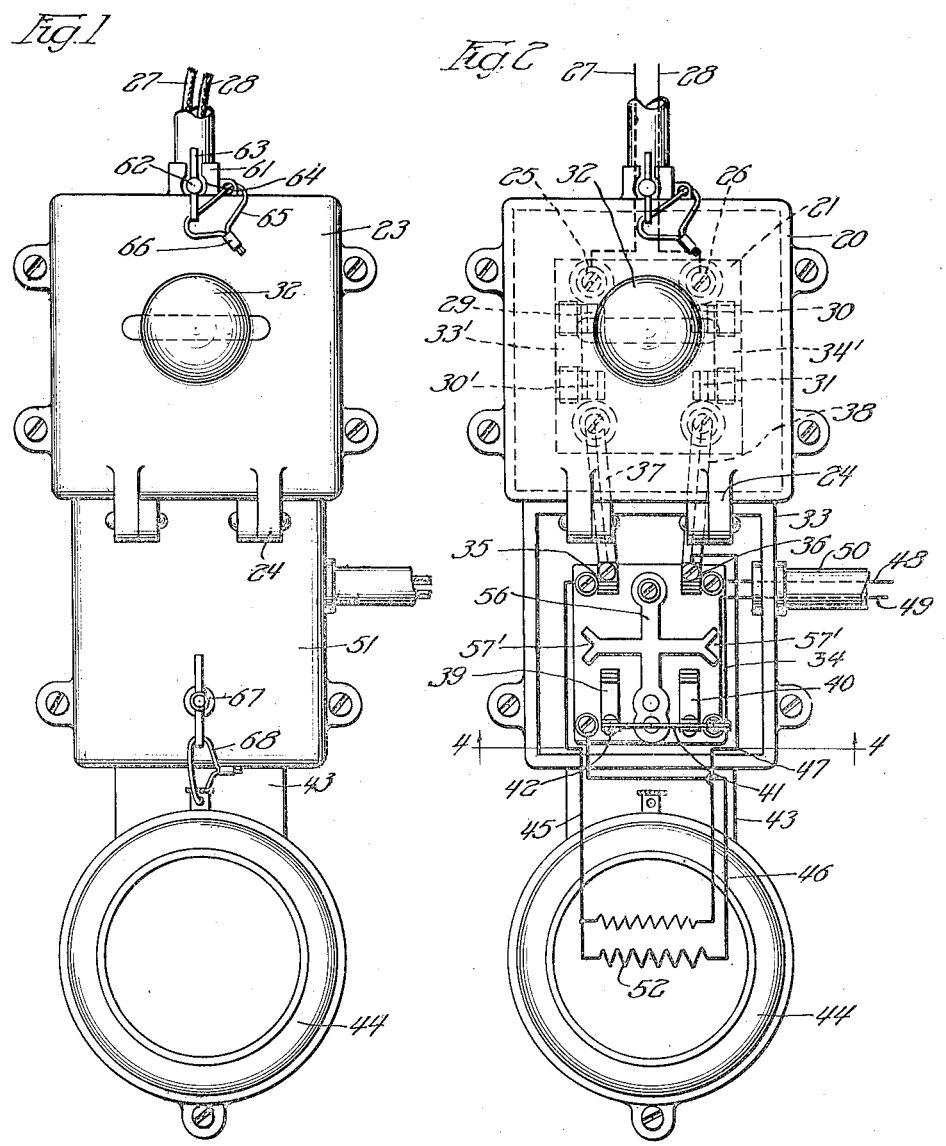

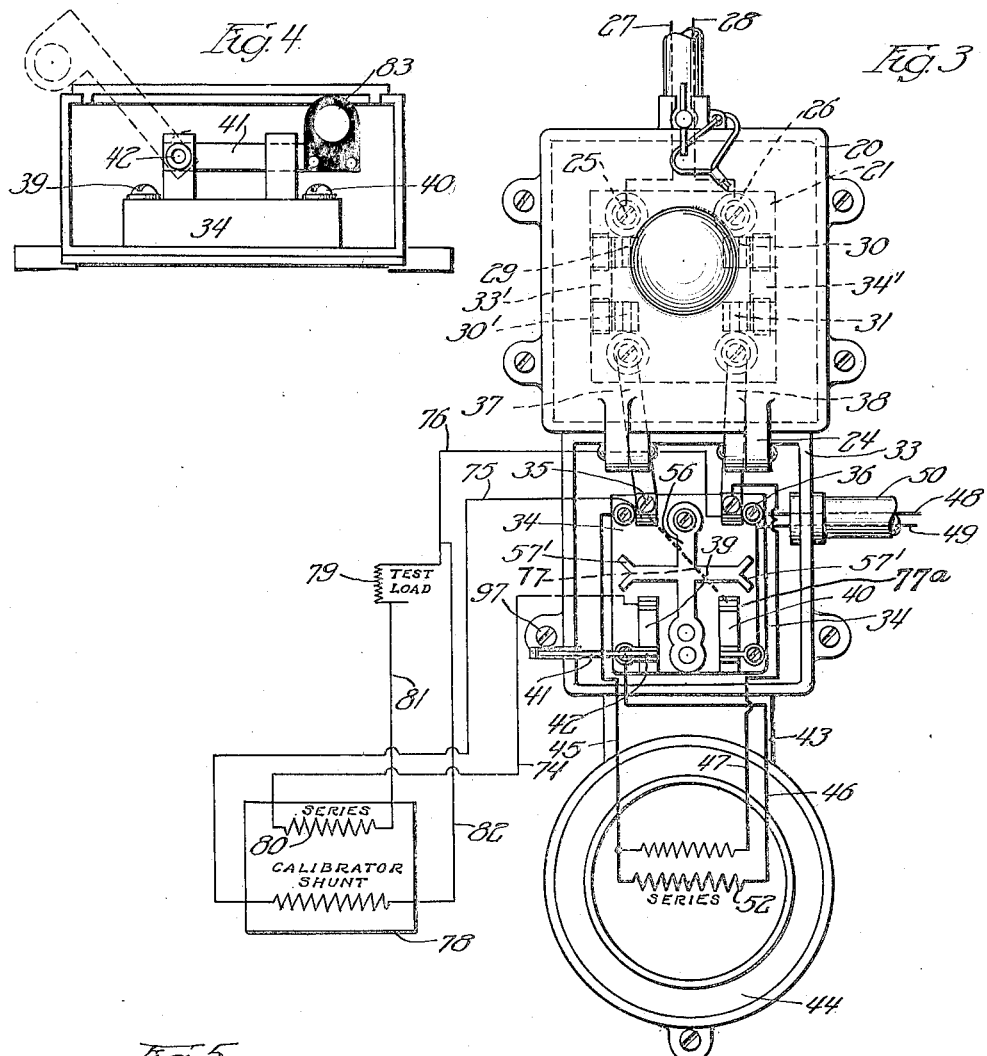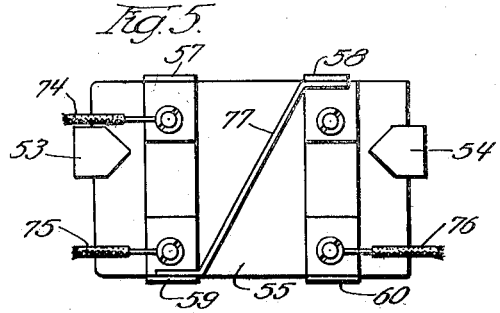

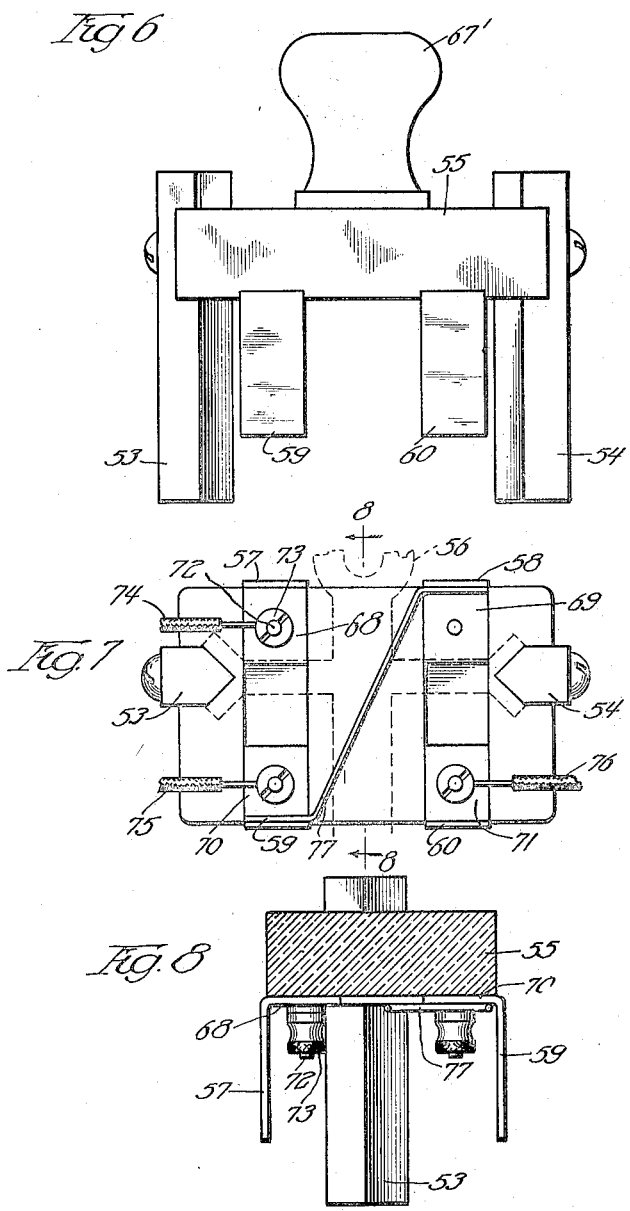

Patented Aug. 11, 1925.

1,548,883

UNITED STATES PATENT OFFICE.

BRYSON D. HORTON, OF DETROIT, MICHIGAN, ASSIGNOR TO SQUARE D COMPANY, OF DETROIT, MICHIGAN, A CORPORATION OF MICHIGAN.

ELECTRIC SWITCH AND TEST DEVICE.

Original application filed April 22, 1913, Serial No. 762,773. Divided and this application filed May 28, 1920. Serial No. 384,858.

*To all whom it may concern:*

Be it known that I, BRYSON D. HORTON, a citizen of the United States, residing at Detroit, in the county of Wayne and State of Michigan, have invented new and useful Improvements in Electric Switches and Test Devices, of which the following is a full, clear, concise, and exact description, reference being had to the accompanying drawing, forming a part of this specification.

This invention relates to an improved form of electric switches and test devices, and more particularly to improved circuit controlling apparatus and improved means for interconnecting and associating said apparatus to obtain simplified and more efficient switching.

This application is a division of my co-pending application Serial No. 762,773, filed April 22nd, 1913.

The principal requisites of a service and meter test device resides in the production of means whereby the service circuit can be quickly switched from the service condition to the meter test condition. In this switching operation, according to the best commercial practice, the service meter is disconnected from the load circuit and this switching should be accomplished without interrupting the connection between the service and load circuits. When the normal service circuit is thus converted to the test condition, with the service meter disconnected from the load, the power supplied to the consumer is not measured. It is therefore very essential that the circuit be restored to the original service condition as soon as the meter has been tested.

It is one of the objects of this invention, therefore, to provide a service and meter testing circuit and associated apparatus which are provided with improved means for a quick, simple and expeditious switching of the circuit from the service to the test condition, and vice versa.

Another object of this invention consists in the provision of improved test switching means interposed between the service switch and the load, the said switching means being adapted to carry and properly interrupt the complete load current.

Another object consists in the provision of a conveniently operable meter test apparatus which permits uninterrupted service to the customer and which at the same time permits the retention in the circuit of the desired protective devices.

An additional object consists in the provision of a conveniently operable meter test apparatus in which the meter is tested from line potential independently of the load circuit, and in which improved means are provided to facilitate the establishment of the calibrating circuit for this purpose.

Further objects of the invention will become apparent from the following description and the appended claims.

For the purposes of description, several embodiments of this invention are illustrated in the accompanying drawings, in which:

Figure 1 illustrates in front elevation the service switch and testing device enclosure, together with a meter, the meter and the service switch and testing device enclosure being combined in a protective structure for the associated apparatus and interconnecting wiring;

Figure 2 is a front elevation of the enclosure illustrated in Figure 1, with the cover removed, and shows the service switch and meter-testing switching apparatus positioned within said enclosure, and the service circuit indicated diagrammatically;

Figure 3 is a view similar to Figure 2 with the test meter circuits diagrammatically included;

Figure 4 is a section taken on the plane indicated by the line 4—4 of Figure 2, looking in the direction of the arrows, of the meter test apparatus enclosure;

Figure 5 is a bottom plan view of the test plug by means of which the test connections are made;

Figure 6 is a side view of the test plug, showing the positioning keys employed to facilitate the centering of the plug and assure proper interconnection between the plug and its co-operating fixed testing apparatus;

Figure 7 is a bottom plan view of the test plug showing the operative position of the keys and the grooved barrier; and Figure 8 is a detail of the test plug, taken on the plane represented by the line 8—8 of Figure 7, looking in the direction of the arrows.

Referring now in detail to the embodiment illustrated in the drawings, it will be noted that the housing or enclosure 20, carries an insulating base 21, and is fitted with a cover 23 hinged at 24. Mounted upon the base 21 are the service line terminals 25 and 26, to which are attached the service conductors 27 and 28. The line terminals 25 and 26 also carry the switch contact clips 29 and 30; and positioned on the opposite end of the insulating base 21 are the cooperating switch contact clips 30' and 31 respectively. The switch contact clips 29 and 30' respectively and 30 and 31 respectively, are bridged by the movable portion of a switching mechanism operated by the handle 32, which mechanism is supported on the hinged cover 23 of the receptacle, and consists of conventional switch blades and protecting fuses 33' and 34', shown in broken lines in Figures 2 and 3.

Mounted directly beneath the service switch enclosure 20 is the enclosure 33 carrying the testing apparatus. This apparatus consists of an insulating base 34 mounted on the bottom of the housing 33, said insulating base 34 being equipped with the terminal clip contacts 35 and 36, to which are secured the contact bars 37 and 38, which are carried through an opening interconnecting the housings 20 and 33, to the service switch contact clip terminals 30' and 31. Secured to the lower end of the insulating block 34 are the terminal clip contacts 39 and 40, the clip contacts 39 and 40, together with the movable connector element or switch blade 41, constituting means for opening the normal load circuit during a test. The blade 41 is pivoted to the clip contact 39 at 42 and cooperates with suitable clip contacts in the terminal clip contact 40. Connected to the housing 33 by a suitable meter adapter 43 is any type of an electric meter 44 of usual and well known construction. The meter is electrically connected with the testing switch by means of the wires 45, 46 and 47, these wires all being carried through the meter adapter 43 and completely enclosed in the protective enclosure.

The consumer's load is connected to the conductors 48 and 49 and is carried in to the enclosure 33 through a suitable opening in the wall of the enclosure, with which is preferably interconnected a conduit such as 50. A suitable cover or lid 51 is fitted over the enclosure 33 and locked and sealed in place as hereinafter to be described.

In the embodiment of the invention illustrated in Figures 1, 2 and 3, the service switch and meter test enclosing housing are shown as individual and separate parts, but obviously these parts could readily be combined into one enclosure, capable of receiving all the apparatus associated with the service circuit as well as the switching circuit.

With the apparatus positioned as indicated in Figure 2, the current will be fed to the consumer through the service switch and the meter over a circuit which may be traced as follows: From service lead 27 to terminal 25, through the combined fuse and switch blade 33' to switch contact 30', and then by way of the conductor strip 37 to the terminal 35, thence by way of conductor 45 to the series coil 52 of the service meter and conductor 46 to terminal 39, through the meter load disconnecting switch to terminal 40 and to conductor 49 of the load circuit, through the load circuit, and back by way of load conductor 48 to terminal 36, conductor strip 38, terminal 31, combined fuse and switch blade 34', and terminal 26 to the other service line conductor 28.

In order to make connection with the test contact clips 35, 36, 39 and 40 of the meter test apparatus, a test plug illustrated in Figures 5, 6, 7 and 8, equipped with two depending angular-faced keys, or centering portions, 53 and 54, is provided. These are attached to the base of the plug 55 and are positioned slightly off center as shown in Figures 5 and 7. Cooperating with these positioning members or keys is a suitable barrier 56, rigidly secured to the insulating base 34 of the test switch, said barrier being fitted with laterally extending wings whereby angular grooves or key-ways 57' for the reception of the positioning members 53 and 54 are provided.

Due to the off-centering of the keys or projecting members 54 and 53, and the necessity of aligning the test switch contact clips 57, 58, 59 and 60, with the clip contacts 39, 40, 35 and 36 respectively, on the insulating base, it is impossible to insert the test plug knife blade contacts 57 to 60 inclusive into the test switch contact clips in a wrong position.

In the normal operative condition of the units illustrated in Figures 1, 2 and 3, the cover of the service switch is retained closed by means of a lug and thumb nut connection, which consists of the lug 61, integrally with the cover 23, a screw 62 carried by the body of the enclosure, and a nut 63 having a collar 64 cooperating with the screw 62 and the lug 61 to hold the cover in its closed position. The thumb nut 62 is provided with an eye or perforation, and a like perforation is provided for the lug 61 through which is threaded a sealing wire 65, the ends of which are joined by any suitable seal such as 66.

A similar construction 67 is provided for holding the cover 51 of the test enclosure 33 in closed position, and a similar sealing means 68 is employed for sealing both the meter cover and the test switch cover 51 in closed position for the purpose of preventing tampering with the connections without detection.

When it is desired to test the service meter 44 the cover 51 of the test enclosure 33 is removed and the test plug illustrated in Figures 5, 6, 7 and 8 is connected in position with its cooperating test contact clips. The test clips 57 to 60 inclusive of the test plug are mounted on the insulating base 55, the base 55 being equipped with a suitable operating handle 67'. The switch contacts 57 to 60 are preferably made L-shaped, each having an in-turned end 68, 69, 70 and 71. Ends 68, 70 and 71 are provided with binding posts such as 72, fitted with cooperating binding nuts 73. Connected to the clips 57, 59 and 60 by means of the binding nuts such as 73, are the test conductors 74, 75 and 76 respectively.

With the cover 51 of the test enclosure removed, the first operation in making the test is to insert the test plug with its associated test clips 57, 58, 59 and 60, in position in the cooperating test contact clips 39, 40, 35 and 36 respectively. When the test plug is thus placed in position the meter is bypassed by means of the conductor 77 interconnecting the terminals 58 and 59 of the test plug.

The next operation in making the test is to open the meter load disconnecting switch 41 which disconnects the service meter from the load circuit. When these operations have been performed the current or power from the service circuit is fed directly to the load circuit without passing through the service meter, said meter being disconnected from the load circuit, and the test circuit for calibrating the service meter is established and comprises a suitable test meter 78, and an artificial load 79, with the proper interconnection therebetween connected to the test plug.

This conversion of the circuit to the test condition in which the current to the customer is bypassed and the meter disconnected from the load circuit is performed without in any way operating the service switch and its appurtenant apparatus, and consequently the test plug and its associated connections, as well as the load circuit, are protected by the main service switch and fuses 33' and 34'.

With the apparatus in this condition, the flow of current to the load circuit may now be traced on the wiring illustrated in Figure 3. From the service conductor 27 through the service switch to the interconnecting conductor 37, to the contact terminal 35, thence through the bypass conductor 77 and terminal 77ª to conductor 49 of the load circuit, through the load, back over conductor 48 of the load circuit to terminal 36, and thence through the interconnecting conductor 38 and the other side of the service switch to the other service lead 28.

In this circuit it will be noted that the meter load circuit which was connected from one side of the service circuit 27 through the service switch, the conductor 37 and contact 35, through the coil 52 of the meter to contact 39 of the load switch and thence through the blade of the load switch 41 and the terminal 40 of the load switch to the load conductor 49, having been bypassed, may be opened by the meter load disconnecting switch 41 at the contact clip 40, thereby disconnecting the meter at this point from the load circuit.

The service meter 44 can now be readily tested without interfering with the supply of current to the consumer and this test circuit may be traced as follows: From the service conductor 27, through one side of the service switch, the conductor 37, and thence over wire 45 through the series coil 52 of the service meter to terminal 39, thence over wire 74 to the series coil 80 of the calibrating meter, wire 81 to the test load 79, through the test load and thence by means of wire 76 to the contact 60 of the test plug, the terminal 36 and conductor 38, to the other side of the service switch and service wire 28.

In this meter test or calibrating circuit just outlined, the series coil of the service meter is connected in series with the series coil of the calibrating meter, and in series with an artificial load across the potential of the service circuit. The shunt coil of the service meter is connected across the line from the contact 35 to the contact 36. The shunt coil of the calibrating meter is connected across the same contacts, the current flowing from contact 35 through lead 75, the coil, leads 82 and 76 to the clip 36.

With these conditions established the meter can be properly calibrated without interference of any kind with the supply of power to the consumer. The load controlling switch or meter load disconnecting switch 41 is arranged to prevent the closing of the housing or enclosure 33 for the meter test switching apparatus, unless the said meter load disconnecting switch is in its normal position, in which condition the power supplied to the consumer passes through the series coil of the service meter. This requirement is desirable so as to necessitate the switching of the connections to such condition, after testing the meter, that the meter will be included in the service circuit.

To accomplish this purpose the blade 41 of the meter load disconnecting switch is fitted with a handle 83 of insulating material, as clearly indicated in Figure 4, the said handle being so positioned that when the meter load disconnecting switch is operated to its extreme open position the curved forward apertured portion of said insulating handle will rest on the top edge of the enclosing wall of the housing 33. With the switch handle in this position it will be evident that the cover 51 cannot be placed upon said enclosure. In order to place said cover on the enclosure the blade of the meter load disconnecting switch must be switched to its closed position, and in order to insure that the blade will be moved to its extreme closed position the upwardly extending portion of the handle 83 is of such size and is so designed that said upper portion of the handle will just clear the cover 51, when the said cover is locked in place. Consequently if at any time the switch blade 41 is operated so that the blade does not properly contact with its cooperating switch contacts, due to an incomplete operation of the switch blade, the said blade will be driven home to its closed position by the cover 51 when it is placed in position because of the intercontacting surfaces of the top of the handle 83 and the inside surface of the cover 51. Consequently when the tests are completed and the switch plug is removed the housing or enclosure cannot be put in its normal closed condition without switching the service meter into its proper position in the load circuit.

In this connection it should be noted that the meter load disconnecting switch, with its blade 41 and cooperating contacts 39 and 40, is connected in the load circuit so that the circuit to the consumer may be interrupted by this switch. The construction of this switch is such that it will properly carry all the current flowing in the load circuit and will likewise properly function to interrupt the current flowing in said circuit. The meter load disconnecting switch may consequently be used if desired in place of the service switch in the circuit here shown for interrupting the flow of current from the service circuit to the load circuit.

Obviously this invention is not limited to the specific embodiment thereof herein illustrated and described but is capable of many variations and other applications within its spirit and scope, as pointed out in the following claims.

Having thus described my invention, what I claim as new and desire to secure by Letters Patent is:

1. A switch and fuses associated therewith arranged on a unitary base, and means comprising additional terminals associated with said switch whereby a meter calibrating and testing circuit may be connected to said switch without disturbing a load circuit derived therefrom.

2. A unitary switch and meter testing apparatus adapted to have meter testing connections associated therewith and comprising switching members, contacts for receiving testing connections arranged at the ends of said members, and test connection means whereby tests and service meter calibrations may be made with said switch without disturbing the circuit feed therefrom.

3. A unitary switch and meter testing apparatus adapted to have meter testing connections associated therewith and comprising switching members, contacts for receiving testing connections arranged at the ends of said members, and test connection means whereby service meter calibrations may be made with said switch without disturbing the circuit fed therefrom, all of said instrumentalities being arranged on one unitary base.

4. A unitary switch and meter testing apparatus adapted to have meter testing connections associated therewith whereby calibrations may be made of meters connected therewith without disturbing the circuit fed therefrom, said aggregate comprising switching members, terminals at the ends of said members for receiving testing connections, and further terminals to facilitate the establishment of a testing circuit.

5. A unitary switch and meter testing apparatus adapted to have meter testing connections associated therewith whereby calibrations may be made of meters connected therewith without disturbing the circuit fed therefrom, said aggregate comprising switching members, terminals at the ends of said members for receiving testing connections, and further terminals whereby a service meter coil, a test meter coil, and a test load may be arranged in series while the load circuit is undisturbed.

6. A unitary switch aggregate adapted to have meter test connections associated therewith whereby calibrations of a service meter connected to said switch may be made without disturbing a load circuit fed through the switch, said aggregate comprising a switching member in each leg of said load circuit, and testing terminals at the ends of said switching members.

7. A unitary switch aggregate adapted to have meter test connections associated therewith whereby calibration of a service meter connected to said switch may be made without disturbing a load circuit fed through the switch, said aggregate comprising a switching member and a fuse in each leg of said load circuit, and testing terminals at the ends of said switching members.

8. A unitary switch aggregate adapted to have meter calibration connections associated therewith whereby tests of a service meter may be made without interfering with a load circuit derived from said switch, said aggregate comprising a switching member in each leg of said load circuit, a fuse in each of said legs, test terminals at the ends of said switching members, and a contact block embodying additional test terminals.

9. A unitary switch aggregate adapted to have meter calibration connections associated therewith whereby tests of a service meter may be made without interfering with a load circuit derived from said switch, said aggregate comprising a switching member in each leg of said load circuit, a fuse in each of said legs, test terminals at the ends of said switching members, a contact block embodying additional test terminals, and a by-pass member adapted to be positioned between certain of said terminals whereby a service meter coil, a test meter coil, and a test load may be arranged in series while said load circuit remains undisturbed.

10. A unitary self-contained service switch, cut-out and testing appliance combined comprising a single supporting base, service terminals and load terminals mounted thereon, fusible cut-outs thereon, one in each leg of the circuit, a switch blade in each leg of the circuit, testing terminals associated with each of said switch blades, meter terminals between which a meter may be connected, and auxiliary testing terminals and devices for the reception of a by-pass to by-pass the load current past the meter, for connecting a testing meter in circuit, and for disassociating the meter from the load circuit.

11. A unitary switch aggregate adapted to have meter calibration connections associated therewith whereby tests of a service meter may be made without interfering with a load circuit derived from said switch, said aggregate comprising a switching member in each leg of said load circuit, a fuse in each of said legs, test terminals at the ends of said switching members, a by-pass member for insuring the non-disturbance of the load circuit derived from said switch during the test, and means in the normal service meter and load circuit for opening said normal circuit to establish a test circuit.

12. A switch and meter test apparatus comprising fuse members, switch members and contacts on a unitary base, test connections at the ends of said members, and said fuses being so arranged that they are dead when the switch is open, and means on said apparatus for establishing the proper connections for meter calibration without affecting the load derived through said switch.

13. A switch and meter test apparatus comprising fuse members, switch members and contacts on a unitary base, test connections at the ends of said members and said fuses being arranged on the load side of said switch members so that they are dead when the switch is open, and means on said apparatus for establishing the proper connections for meter calibration without affecting the load derived through said switch.

14. A switch and meter test apparatus comprising fuse members, switch members and contacts on a unitary base, test connections at the ends of said members, and said fuses being so arranged that they are dead when the switch is open, and means on said apparatus for establishing the proper connections for meter calibration without affecting the load derived through said switch, the service switch remaining closed during said calibration, said means comprising a by-pass member and a circuit-breaking connection.

15. A switch and meter test apparatus comprising fuse members, switch members and contacts on a unitary base, test connections at the ends of said members, and said fuses being so arranged that they are dead when the switch is open, and means on said apparatus for establishing the proper connections for meter calibration without affecting the load derived through said switch, said means comprising a connecting member which may be moved to open the normal service meter and load circuit to establish a test circuit.

16. A switch and meter test apparatus comprising fuse members, switch members and contacts on a unitary base, test connections at the ends of said members, and said fuses being so arranged that they are dead when the switch is open, and means on said apparatus for establishing the proper connections for meter calibration without affecting the load derived through said switch, said means comprising a circuit controlling connector element which may be moved to open the normal service meter and load circuit to establish a test circuit, and a by-pass member connectible between some of said contacts for causing said load to by-pass the service meter.

17. In a watt-hour service meter testing system, the combination with service leads and a load circuit, of connections therebetween, comprising a service switch adapted to be maintained in closed position during meter testing, a meter for measuring the flow of power from said service leads to said load circuit, meter leads and permanent connections therefor, a disconnecting switch for opening the normal load circuit, intermediate said meter and load circuit, a bypass device whereby said meter and disconnecting switch may be relieved of the load, and test meter contacts associable with leads, whereby said service meter may be tested.

18. In a watt-hour service meter testing system, the combination with service leads and a load circuit, of connections therebetween comprising a service switch adapted to be maintained closed during meter testing, a meter for measuring the flow of power from said service leads to said load circuit, meter leads and permanent connections therefor, a disconnecting switch for opening the normal load circuit intermediate said meter and said load circuit, test contacts associated with said service switch and said meter load disconnecting switch, a bypass adapted to be inserted into some of said contacts to bypass the meter during test, the remaining test contacts being associable with leads whereby said service meter may be tested while current is supplied from the service leads to the load circuit by way of the bypass and independently of the service meter.

19. In combination, service leads, a load circuit, and connections therebetween comprising a service switch adapted to be maintained closed during a meter test, a meter adapted to measure the power transmitted to said load circuit, and a disconnecting switch for opening the normal load circuit intermediate said meter and said load circuit, operable independently of said service switch and capable of interrupting all the current flowing in the load circuit, said switch also operating to disconnect the meter from the load circuit so that the said meter may be calibrated.

20. In combination, service leads, a load circuit and connections therebetween comprising a service switch adapted to remain in closed position during meter testing, a meter adapted to measure the power transmitted to said load circuit, and a disconnecting switch for opening the normal load circuit intermediate said meter and said load circuit, the latter being independently operable of said service switch and being capable of interrupting all the current flowing in the load circuit, said switch also operating to disconnect the meter from the load circuit so that the said meter may be calibrated, and test contacts associated with said service switch and said meter load disconnecting switch, said contacts being associable with leads whereby said service meter may be by-passed during test and whereby said service meter can be included in a calibrating circuit connected to the service potential.

21. In a device of the class described, in combination, a service switch adapted to remain closed during meter testing, a plurality of fixed contacts, some of which are connected to the service switch, others of which are connectible to a meter, and others of which are connectible to a load, a plurality of test connection contacts associated with the fixed contacts to which test leads associable with a test meter may be connected, a bypass adapted to extend between a load connectible contact and a service switch connected contact, said bypass serving to feed current from the service switch to the load independently of the service meter, the aforesaid test meter and test leads associated with the test connections being connected in series with the service meter across the service potential to calibrate said meter independent of the load and while said load is bypassed.

22. In a device of the class described, the combination with a service switch associated with fuses, said service switch being adapted to remain closed during meter testing, a service meter, a load circuit and interconnecting means therebetween whereby the service meter will normally measure the flow of power to the load circuit, a test circuit including a test meter, a switch capable of making and breaking full load current and disconnecting said service meter from the said load circuit during test, said test and load circuit being in parallel and both being controlled by said switch and protected by said fuses.

23. In a device of the character described, a service switch adapted to remain closed during meter testing and calibrating, a load circuit in electrical connection with said switch, a calibrating circuit variable independently of the load circuit, a service meter interposed between said load circuit and said service switch to measure the power delivered to said load circuit, means capable of making and breaking full load current adapted to disconnect the meter from the load circuit, and means whereby the flow of current from the service switch to said load circuit will be uninterrupted when the meter is thus disconnected, said means serving to bypass the meter and remain in circuit to supply power from the service switch to the load circuit during the calibration of said meter.

24. In a watt-hour service meter testing appliance, comprising a plurality of pairs of contacts and their cooperating connectors, one of which constitutes a switching element for opening the normal load circuit, a bypass device adapted to bypass the service meter during test, at least one contact of each pair having means to receive said bypass device whereby the appliance may be adapted for meter testing without disturbing, or imposing additional connections on, any of the service contacts.

25. In a watt-hour service meter testing appliance, comprising a pair of contacts, a switching connector cooperative therewith to open and close connection therebetween and thereby open the normal load circuit, and a bypass device adapted to bypass the service meter during tests, one of the contacts having means electrically connected therewith for the connection thereto of testing means.

26. A watt-hour service meter testing appliance, comprising a pair of contacts and a connector cooperative with the contacts to open and close connection therebetween, said contacts being each provided with wire connecting means, and a bypass device adapted to bypass the service meter during test, one of the said wire connecting means having means in electrical connection therewith for the connection thereto of said bypass device.

27. A watt-hour service meter testing appliance, comprising two pairs of contacts, a service side connector cooperative with one pair of contacts to open and close connection therebetween, a load side connector cooperative with the other pair of contacts to open and close connection therebetween, a bypass device adapted to bypass the service meter during test, at least one contact of each of said aforesaid pairs of contacts having means for connection therewith of said bypass device for bypassing current from one of said pairs of contacts to the other of said pairs of contacts during test.

28. A watt-hour service meter testing appliance, comprising a pair of contacts and a connector cooperative therebetween to open and close connection therebetween, one of the contacts having wire connecting means, and also having a testing device receiving socket electrically connected therewith, and a bypass device adapted to be connected to said socket to bypass the meter during test.

29. A watt-hour service meter testing appliance, comprising a pair of contacts, a connector cooperative with said contacts to open and close connection therebetween, a wire connecting means associated with said contacts, and a bypass device adapted to bypass the service meter during test, at least one of said wire connecting means having associated therewith means for connection thereto of said bypass device.

30. A watt-hour service meter testing appliance, comprising a pair of clip contacts, a blade connector pivoted between the lips of one of the contacts and movable into and out of contact engagement with the other clip contacts, said clip contacts having wire connecting means electrically associated therewith, and a bypass device adapted to bypass the service meter during test, one of said wire connecting means having a testing receiving means electrically associated therewith to receive said bypass device.

31. In a watt-hour meter testing appliance, in combination, a fusible cut-out element and a switching element to open the normal load circuit respectively connectible to opposite terminals of a meter coil, and means whereby current may be bypassed around the meter coil when the switching element is open to disconnect the meter coil from the load circuit and supply the load circuit with power through said bypassing means independently of the meter while the meter is being tested.

32. A watt-hour meter testing appliance, comprising in combination, two pairs of contacts, a service side connector cooperative with one pair of contacts to open and close connection therebetween, a load side connector cooperative with another pair of the contacts to open and close connection therebetween, and a bypass device adapted to bypass the service meter during test, the meter coil end contact of the first mentioned pair and the load end contact of the second mentioned pair having means for the connection therewith of said bypass device.

33. A watt-hour service meter testing appliance, comprising two pairs of contacts and connectors cooperative with the respective pairs of contacts to open and close connection therebetween, and a bypass device adapted to bypass the service meter during test, at least one contact of each pair having means electrically connected therewith for the connection thereto of said bypassing device.

34. A watt-hour service meter testing appliance, comprising two pairs of contacts, a connector cooperative with each pair of contacts to open and close connection therebetween, and a bypass device adapted to bypass said service meter during test, at least one contact of each pair having means for connection therewith of said bypass to electrically bridge across the pairs of contacts independently of the connectors.

35. In a watt-hour service meter testing appliance of the character set forth, comprising a switching element for opening the normal load circuit and a cut-out element and their cooperating contacts, one contact of each element having means for the connection therewith of a meter coil, and a bypass device adapted to bypass the current coil of said meter during the calibration of the meter, and one contact of each of said elements having means for connection therewith of said bypass device.

36. A watt-hour service meter testing appliance of the character set forth, comprising in combination a switching element for opening a normal load circuit and its complemental contacts, one of said contacts constituting a load connectible contact and the other a meter coil connectible contact, the switching element when in the open position electrically freeing the meter current coil connectible contact, a circuit controlling element connectible on the service side, and a bypass device adapted to bypass the current coil of the service meter during test, the aforesaid service element and the load side connectible contact of the switching element having means adapted to receive said bypass device between the two elements.

37. A watt-hour service meter testing appliance, comprising in combination a cut-out element connectible to the service side and a switch element connected to the load side of the meter coil, and a bypass device adapted to bypass the current coil of the service meter during test, said cut-out element at its meter connectible end and said switching element at its load connectible end being provided with means to receive said bypass, whereby current may be by-passed between the two elements and around the meter coil and switch break during the test of the meter and while the switching element is open.

38. A watt-hour service meter testing appliance of the character set forth comprising in combination, a service side connectible fuse cut-out element and a load side connectible switching element, and a bypass device adapted to bypass the service meter during test, each of said aforesaid elements being provided with means for receiving said bypass device to bypass current from one end of one element to the opposite end of the other element, whereby said meter may be tested independently of the load circuit and from the line potential.

39. In a watt-hour service meter testing appliance of the character set forth, comprising two cooperative elements connectible respectively with opposite terminals of the current coil of the service meter, one of said elements constituting a switching element and the other of said elements constituting a cut-out element, and a bypass device adapted to bypass the current coil of said meter during test, the meter connected end of the cut-out element and the opposite end of the switching element being provided with means for receiving said bypass device, the said switching element being adapted to electrically free the meter terminal connected end when said bypass is in position to disconnect the meter from the load circuit and adapt it for connection across the line potential.

In witness whereof, I have hereunto subscribed my name.

BRYSON D. HORTON.